J. L. LILLICH.
VEHICLE WHEEL TIRE.
APPLICATION FILED FEB. 12, 1916.
1,248,353.  Patented Nov. 27, 1917.
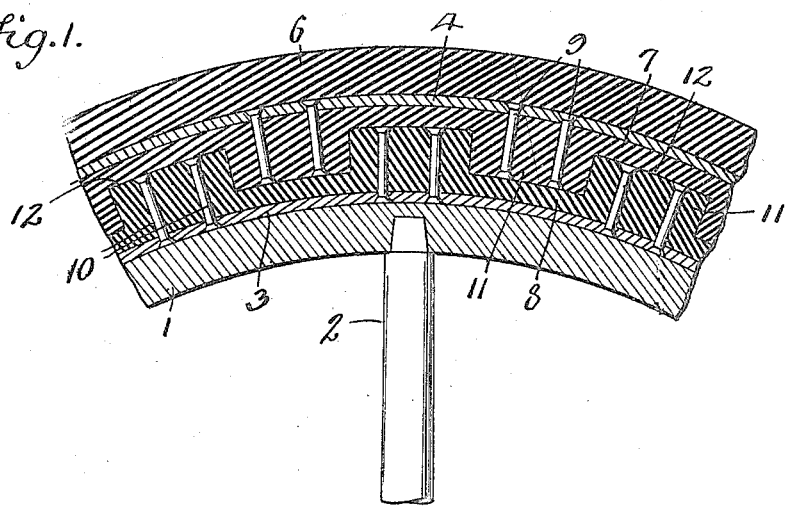
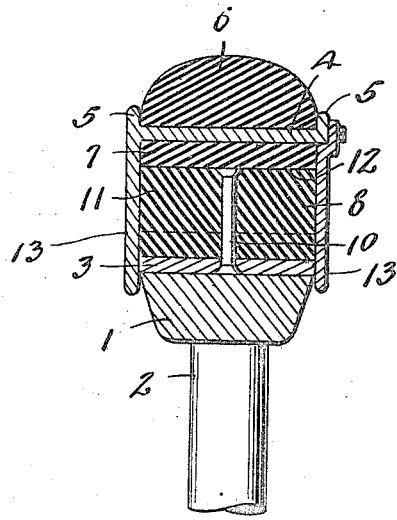
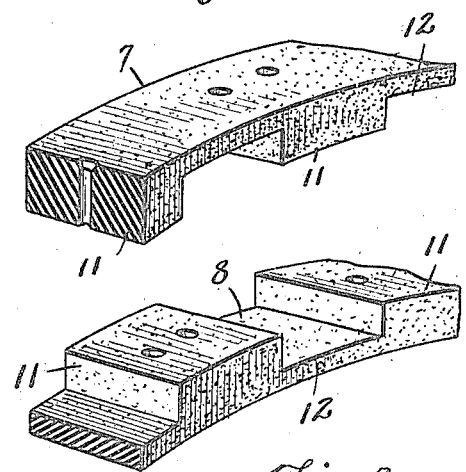

UNITED STATES PATENT OFFICE.

JOHN L. LILLICH, OF CARBON HILL, ALABAMA.

VEHICLE-WHEEL TIRE.

1,248,353.  Specification of Letters Patent.  Patented Nov. 27, 1917.

Application filed February 12, 1916. Serial No. 77,894.

*To all whom it may concern:*

Be it known that I, JOHN L. LILLICH, a citizen of the United States, residing at Carbon Hill, in the county of Walker and State of Alabama, have invented new and useful Improvements in Vehicle-Wheel Tires, of which the following is a specification.

This invention relates to vehicle wheel tires, the object in view being to provide a resilient tire which is not susceptible to punctures and blow outs and in which the parts are so combined that the sections of the sectional cushion may be renewed from time to time as required, the said sectional cushion being interposed between an outer tire carrying rim and an inner fixed rim. The sections of the cushion are so combined that they allow for movement of the outer rim in relation to the inner rim in all directions except transversely of the tire, thereby enabling the cushion to absorb all of the ordinary road shocks and vibrations, in the same manner as a pneumatic tire but without the troubles incident to the use of pneumatic tires.

With the above and other objects in view, the invention consists in the novel construction, combination and arrangement of parts, as herein described, illustrated and claimed.

In the accompanying drawings:—

Figure 1 is a longitudinal section through the tire of this invention, showing also a fragment of the felly and one of the spokes.

Fig. 2 is a transverse section through the same.

Fig. 3 is a fragmentary perspective view of the outer cushion.

Fig. 4 is a similar view of the inner cushion.

1 designates a wheel felly and 2 one of the spokes thereof. In carrying out the present invention, in the preferred embodiment thereof, I employ an inner fixed rim 3 of metal in the form of a band encircling the felly. 4 designates a tire carrying rim which is provided along its opposite margins with outwardly extending tire retaining flanges 5, 6 designating a tire which may be of any construction, the same being illustrated as of solid resilient construction.

Interposed between the outer and inner rims 4 and 3 respectively is a sectional cushion, the same comprising an outer section 7 and an inner section 8. Both sections are preferably composed of resilient material such as rubber and the adjacent faces of the sections 7 and 8 rest and work in contact with each other. The outer section 7 of the cushion is fastened to the outer rim 4 by rivets 9 or the equivalent thereof, and the inner cushion section is fastened to the inner fixed rim 3 by corresponding means as indicated at 10.

The contacting faces of the outer and inner cushion sections 7 and 8 are provided with interfitting tenons 11 and mortises 12 as clearly shown in Fig. 1. These tenons and mortises extend transversely of the tire and mutually coöperate by their resiliency to admit of a certain limited movement of the cushion sections longitudinally with relation to each other, and they also provide the necessary resiliency in radial or substantially radial directions to permit jars and vibrations to be absorbed in the same manner as a pneumatic tire.

It will be noted upon reference to Fig. 1 that the fasteners for the outer cushion are inserted radially through the tenons of the outer cushion and the tire carrying rim only, while other fasteners are inserted radially through the tenons of the inner cushion and the fixed rim only. This provides for securely fastening the outer and inner cushions with or detracting from the resiliency of either cushion in a radial or circumferential direction. Furthermore the cushions are braced circumferentially by each other and by the fasteners 9 and 10.

In order to protect the cushioning sections, the outer rim 5 is provided at the opposite edges thereof with inwardly extending annular housing or casing flanges 13 of sufficient width to extend inwardly beyond the opposite edges of the fixed rim 2 in close proximity to which they are slidable. The flanges 13 serve to exclude dirt and other foreign matter from the cushioning means and form an efficient protector therefor. One of the flanges 13 is preferably made detachable from the rim 4 in order that the several parts of the tire may be easily associated and disconnected.

Having thus described my invention, I claim:—

The combination of a tire-carrying rim, a fixed annular supporting member within said rim in spaced and normally concentric relation thereto, cushioning means interposed between said rim and supporting member embodying an annular outer cushion of resilient material, an inner annular cushion of resilient material, said cushions lying in contact with each other and being provided as to their contacting faces with interfitting tenons and mortises which extend transversely of said faces, one set of fasteners inserted radially through the tenons of the outer cushion and tire-carrying rim only, and another set of fasteners inserted radially through the tenons of the inner cushion and fixed rim only, the extremity of both sets of fasteners which terminate in the tenons being cushioned by the adjacent annular cushion.

In testimony whereof I affix my signature in presence of two witnesses.

JOHN L. LILLICH.

Witnesses:
WALTER HYND,
GEORGE BURT.

Copies of this patent may be obtained for five cents each, by addressing the "Commissioner of Patents, Washington, D. C."